US012796669B2

(12) United States Patent
Pulkrabek

(10) Patent No.: US 12,796,669 B2
(45) Date of Patent: *Nov. 17, 2026

(54) FISHING REEL NOISEMAKER

(71) Applicant: TrikaUSA Inc., Superior, WI (US)

(72) Inventor: Larry Pulkrabek, Superior, WI (US)

(73) Assignee: TRIKAUSA INC., Superior, WI (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/829,839

(22) Filed: Sep. 10, 2024

(65) Prior Publication Data

US 2024/0423184 A1 Dec. 26, 2024

Related U.S. Application Data

(63) Continuation of application No. 17/903,948, filed on Sep. 6, 2022, now Pat. No. 12,121,012.

(60) Provisional application No. 63/241,392, filed on Sep. 7, 2021.

(51) Int. Cl.
*A01K 89/015* (2006.01)

(52) U.S. Cl.
CPC ................................ *A01K 89/0179* (2015.05)

(58) Field of Classification Search
CPC ............ A01K 89/0123; A01K 89/0178; A01K 89/0179; A01K 89/018; A01K 89/051; A01K 89/015; A01K 89/016
See application file for complete search history.

(56) References Cited

U.S. PATENT DOCUMENTS

| | | | | | |
|---|---|---|---|---|---|
| 535,386 | A * | 3/1895 | Medley | A01K 89/0173 | 242/317 |
| 783,842 | A * | 2/1905 | Kramer | A01K 89/01921 | 242/301 |
| 845,805 | A * | 3/1907 | Meisselbach | A01K 89/018 | 242/312 |
| 1,461,043 | A * | 7/1923 | Moll | A01K 89/016 | 242/310 |
| 1,689,914 | A * | 10/1928 | Case | A01K 89/01929 | 242/307 |
| 1,832,421 | A * | 11/1931 | Pflueger | A01K 89/046 | 242/298 |
| 1,836,869 | A | 12/1931 | Pflueger et al. | | |
| 1,899,914 | A * | 2/1933 | Pflueger | A01K 89/0181 | 242/308 |

(Continued)

FOREIGN PATENT DOCUMENTS

| | | |
|---|---|---|
| GB | 2 094 121 A | 9/1984 |
| JP | H09-154448 A | 6/1997 |

*Primary Examiner* — Victoria P Augustine
*Assistant Examiner* — Henrix Soto
(74) *Attorney, Agent, or Firm* — Foley & Lardner LLP

(57) ABSTRACT

A baitcaster for retrieving a fishing line. The baitcaster includes a housing, a spool, and a noisemaker configured to alert a user in response to rotation of the spool. The spool is positioned at least partially within the housing, defines an inner volume, and includes a spindle. The noisemaker includes a sprocket having a plurality of teeth, a pawl positioned alongside the sprocket, and a set of arms abutting the pawl. The set of arms are positioned on opposite sides of the pawl. The pawl is positioned to engage with the plurality of teeth of the sprocket when the sprocket rotates. The noisemaker creates an audible alert when the pawl engages the plurality of teeth and thereafter disengages from the plurality of teeth of the sprocket.

20 Claims, 8 Drawing Sheets

(56) References Cited

U.S. PATENT DOCUMENTS

| | | | | |
|---|---|---|---|---|
| 2,049,666 | A | 8/1936 | Schafer | |
| 2,535,404 | A * | 12/1950 | Fry | A01K 89/033 242/301 |
| 2,601,582 | A | 6/1952 | Zientowski | |
| 2,633,308 | A | 3/1953 | Zientowski | |
| 2,772,576 | A | 12/1956 | Ross | |
| 4,056,246 | A | 11/1977 | Purcell | |
| 4,527,753 | A | 7/1985 | Jones | |
| 4,685,632 | A * | 8/1987 | Yeh | A01K 89/016 242/296 |
| 4,728,054 | A | 3/1988 | Pisapio | |
| 5,022,606 | A | 6/1991 | Hashimoto | |
| 7,866,587 | B2 * | 1/2011 | Ikuta | A01K 89/0178 242/243 |
| 12,121,012 | B2 * | 10/2024 | Pulkrabek | A01K 89/0179 |
| 2005/0006512 | A1 | 1/2005 | Morimoto et al. | |
| 2011/0011968 | A1 | 1/2011 | Ikuta | |

* cited by examiner

FISHING REEL NOISEMAKER

CROSS-REFERENCE TO RELATED PATENT APPLICATION

This application is a continuation of U.S. application Ser. No. 17/903,948, filed Sep. 6, 2022, which claims the benefit of and priority to U.S. Provisional Patent Application No. 63/241,392, filed Sep. 7, 2021, the disclosure of which is incorporated herein by reference in its entirety.

BACKGROUND

The present disclosure relates generally to fishing reels. More particularly, the present disclosure relates to reel clickers on fishing reels.

Fishing reel clickers are configured to alert a user when the spool rotates. This can be used in many applications such as trolling, to know if the reel drag is being engaged, or if fishing line is being reeled in. Traditionally, fishing reel clickers are loud in nature to alert the user, but such an alert presents increased wear onto the fishing reels. Such an aggressive system compromises the integrity of the fishing reel clickers, overall making the fishing reel clickers a common failure in the field.

SUMMARY

At least one embodiment of the present disclosure relates to a baitcaster for retrieving a fishing line. The baitcaster includes a housing, a spool, and a noisemaker configured to alert a user in response to rotation of the spool. The spool is positioned at least partially within the housing, defines an inner volume, and includes a spindle. The noisemaker includes a sprocket having a plurality of teeth, a pawl positioned alongside the sprocket, and a set of arms abutting the pawl. The set of arms are positioned on opposite sides of the pawl. The pawl is positioned to engage with the plurality of teeth of the sprocket when the sprocket rotates. The noisemaker creates an audible alert when the pawl engages the plurality of teeth and thereafter disengages from the plurality of teeth of the sprocket.

Another embodiment of the present disclosure relates to a clicker system for a fishing reel. The clicker system includes a sprocket, a pawl selectively coupled to the sprocket, a set of arms configured to abut the clicker, and a spring. The pawl is repositionable between a first position and a second position. The set of arms includes a first arm coupled to a first joint on a first side of the pawl, and a second arm coupled to a second joint on a second side of the pawl, opposite the first side. The spring is coupled to one of the first arm and the second arm opposite the pawl. The spring is configured to provide a force onto at least one of the first arm and the second arm. The pawl contacts the sprocket when in the first position and does not contact the sprocket when in the second position. The sprocket rotates a first direction and a second direction. The pawl creates an audible click in the first position when the sprocket rotates in one of the first direction and the second direction.

Another embodiment of the present disclosure relates to a fishing rod assembly. The fishing rod assembly includes a rod and a baitcaster fixedly coupled with the rod. The baitcaster configured to retrieve a fishing line that extends along the rod. The baitcaster includes a housing, a spool, and a clicker system configured to alert a user. The spool is positioned at least partially within the housing. The clicker system includes a sprocket, a pawl selectively coupled to the sprocket, an arm configured to abut the clicker, and a spring coupled to the arm. The pawl is repositionable between a first position and a second position. The spring is coupled to the arm. The spring is configured to provide a force onto the arm. The pawl contacts the sprocket when in the first position and does not contact the sprocket when in the second position. The pawl creates an audible click in the first position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
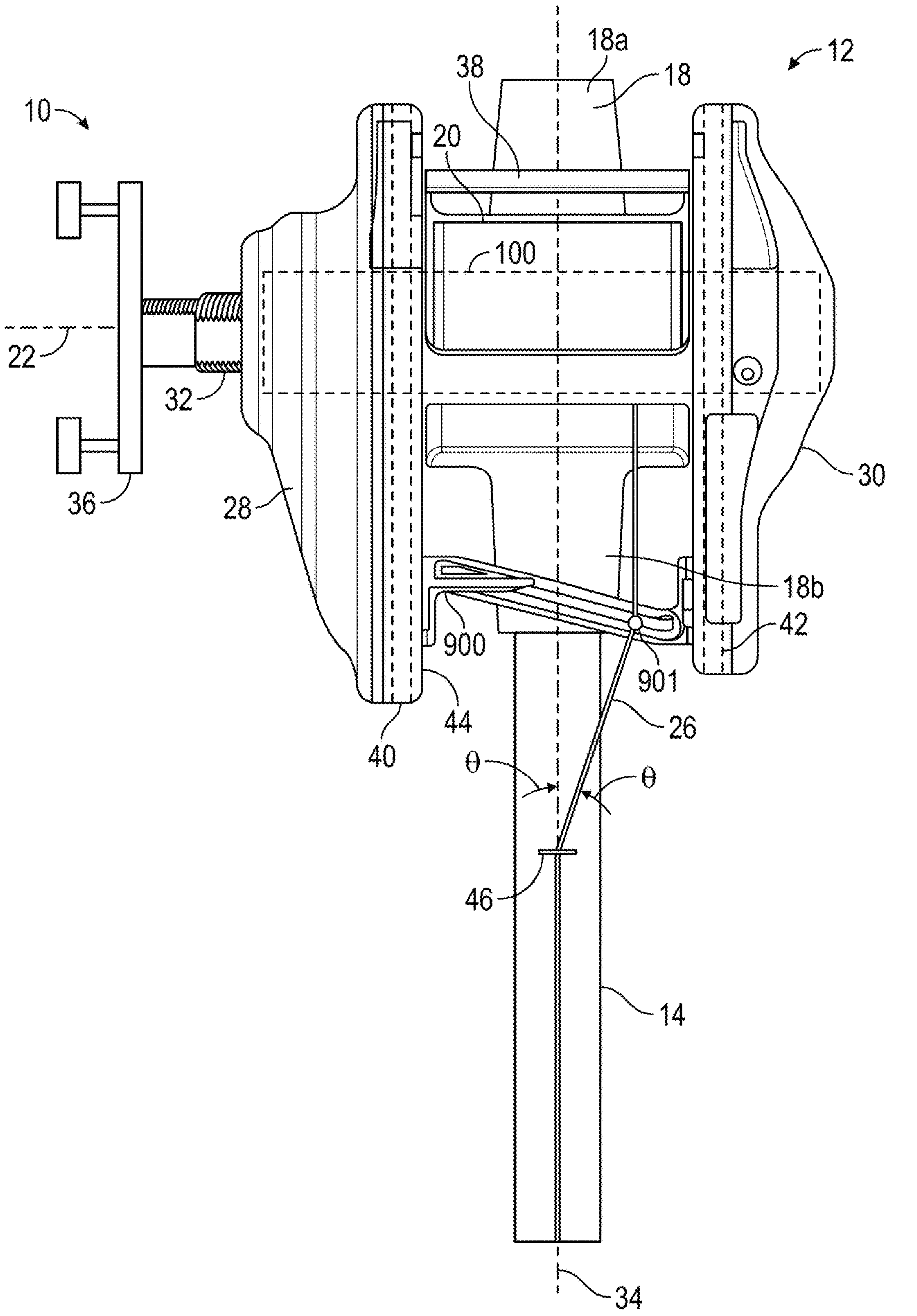
FIG. 1 is a top view of a baitcaster, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

According to an exemplary embodiment, a fishing rod assembly includes a rod and a baitcaster. The baitcaster is fixedly coupled with the rod and is configured to receive a torque input from a user to retrieve or take-up fishing line that extends along the rod. The fishing line may extend through one or more eyelets that are positioned along the fishing rod and guide the fishing line towards the baitcaster apparatus for winding or take-up onto the spool.

The baitcaster may include body members and structural members. The body members may be spaced apart and cooperatively define an inner volume in which a noisemaker is disposed. The noisemaker includes a sprocket positioned along the perimeter of an input shaft and a pawl that may contact the sprocket. The sprocket includes a plurality of teeth that are uniformly positioned along the perimeter of the sprocket. The noisemaker includes a set of arms that are configured to abut the pawl at opposite ends. The arms extend along at least a portion of the body of the baitcaster. The arms are further configured to hold the pawl into a neutral position.

The arms include a first arm and a second arm, where the first arm and the second arm are positioned opposite one another in the noisemaker. The first arm includes a first upper portion and a first lower portion. The first arm further includes a first pivot joint positioned between the first upper portion and the first lower portion. The second arm includes a second upper portion and a second lower portion. The second arm further includes a second pivot joint positioned between the second upper portion and the second lower portion.

A spring is coupled to the arms and positioned distal the pawl. The spring is at least partially disposed within the set of arms and provides an outward force onto the set of arms, causing the set of arms to be biased inward. The force provided by the spring maintains the arms biased inward and pivotable at the first pivot joint and the second pivot joint.

The noisemaker is configured to output an audible alert (e.g., a click, etc.) through engagement and release between the pawl and the sprocket when the sprocket is rotated. The magnitude of the sound is adjustable by varying the spring force applied by the spring and imposed onto the arms. According to an exemplary embodiment, the click is made louder in response to increasing the spring force and made softer in response to decreasing the spring force. The noisemaker further includes stops positioned proximate to the first arm and the second arm. The stops are configured to abut at least one of the first arm and the second arm when the sprocket rotates between positions. The stops prevent unnecessary movement of at least one of the arms to eliminate unnecessary wear on the system.

Baitcaster

Figure 2:
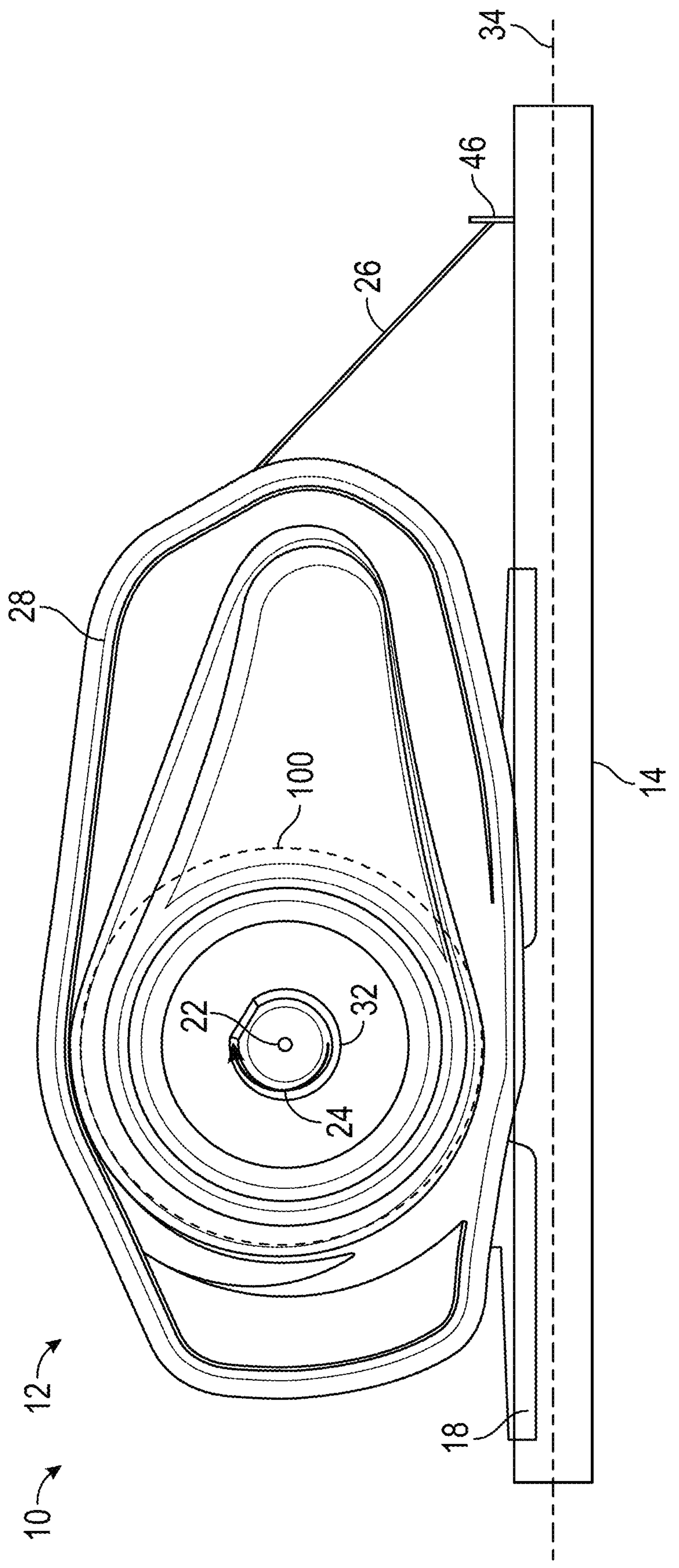
FIG. 2 is a side view of the baitcaster of FIG. 1, according to an exemplary embodiment.
Figure 3:
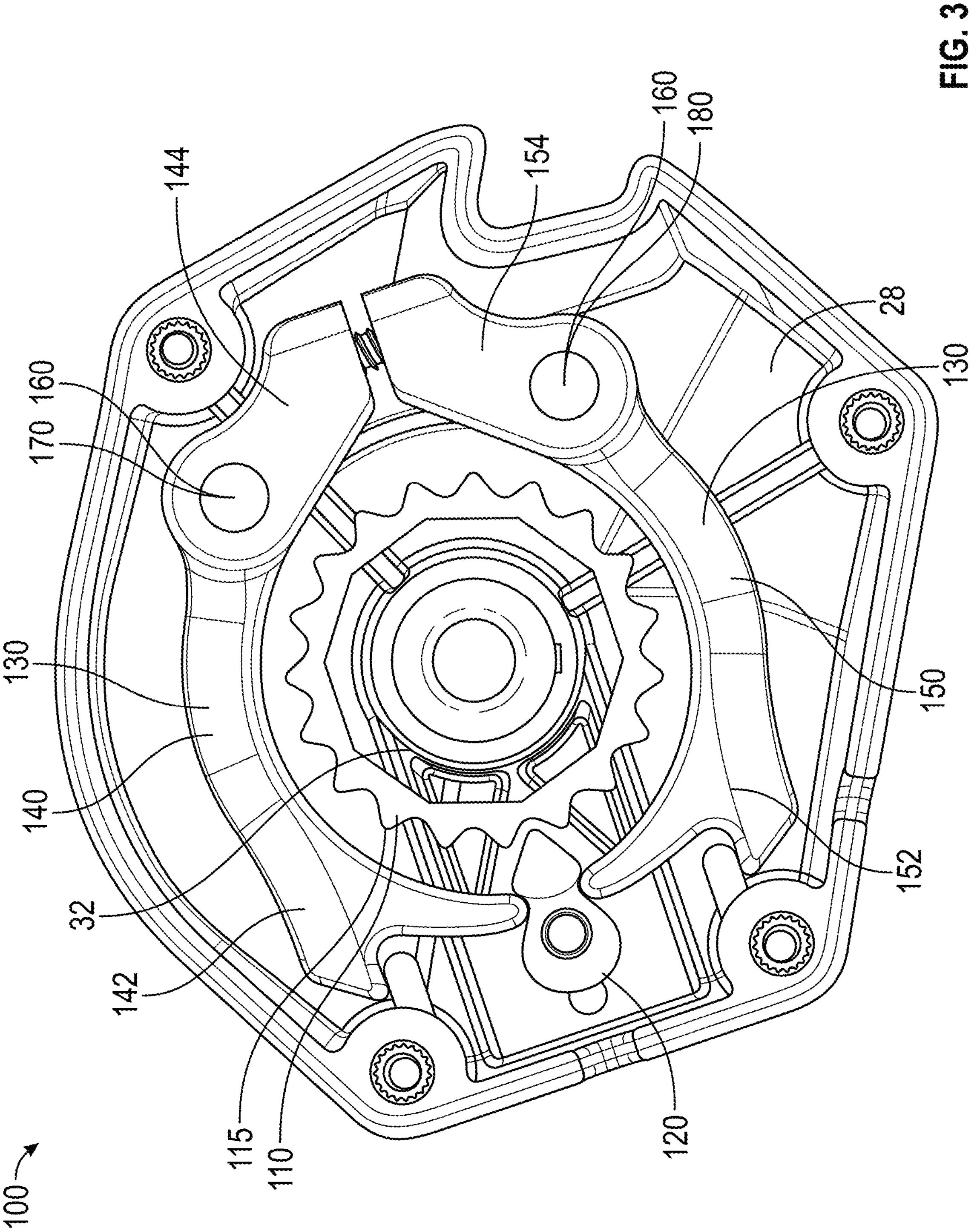
FIG. 3 is a front view of a noisemaker, according to an exemplary embodiment.

Referring particularly to FIGS. 1 and 2, a fishing rod assembly, shown as fishing rod assembly 10, includes a rod, a pole, an elongated member, a flexible member, etc., shown as rod 14, and a reel apparatus, a reel mechanism, a reel assembly, a fishing line retrieval apparatus, etc., shown as reel 12. Reel 12 is fixedly coupled, attached, mounted, etc., with rod 14. In some embodiments, reel 12 is fixedly coupled with the rod 14 through mounts, attachment members, etc., shown as mount 18. Mount 18 may extend from a bottom portion of reel 12 and fixedly couple with rod 14. The mount 18 may include a first end 18*a* and a second end 18*b* fixedly coupled to the rod 14. The first end 18*a* may engage with the reel 12 proximate the bottom of the fishing rod assembly 10 and the second end 18*b* may engage the reel 12 proximate the top of the fishing rod assembly 10, where the second end 18*b* may include threads that are configured to couple the reel 12 to the rod 14.

Reel 12 includes a spool, a barrel, a cylindrical member, etc., shown as spool 20. Spool 20 may be rotatably coupled with an input shaft, a rotatable shaft, a shaft, a first shaft, etc., shown as input shaft 32 such that spool 20 rotates when input shaft 32 is turned. In some embodiments, input shaft 32 is rotatably or fixedly coupled with a handle 36. An axis 22 extends through input shaft 32 and spool 20. Input shaft 32 and spool 20 can be co-axial with each other about axis 22. Handle 36 facilitates an input torque to input shaft 32 about axis 22 for driving spool 20. In some embodiments, handle 36 and input shaft 32 are configured to rotate in a first direction (e.g., direction 24) to take-up fishing line 26 so that fishing line 26 is wound onto spool 20. In still some embodiments, the input shaft 32 may rotate in a second direction (e.g., opposite the direction 24) to release fishing line 26 so that fishing line 26 is unwound from the spool 20. In such an embodiment, fishing line 26 is unwound from the spool 20 when the input shaft 32 is rotated in the second direction by disengaging an anti-reverse switch or when an excessive force is applied to the fishing line 26, where the force is greater than a drag force.

Fishing line 26 can extend along rod 14 and may be guided by one or more eyelets 46. Eyelets 46 can be positioned along rod 14 and can include an opening, a hole, an aperture, etc., through which fishing line 26 passes. Fishing line 26 may extend from an eyelet 46 that is most proximate reel 12 onto spool 20. Rod 14 defines a central axis 34 that extends longitudinally through a center of rod 14. Fishing line 26 may be guided from eyelet 46 that is most proximate reel 12 to spool 20. Fishing line 26 that is between the eyelet 46 most proximate reel 12 and central axis 34 may define an angle θ. The angle θ may change from a maximum positive value $\delta_{+,max}$ to a maximum negative value $\theta_{-,max}$ as fishing line 26 is taken up or reeled onto spool 20.

Reel 12 includes a first or a handle-side body member, housing member, structural member, etc., shown as first body member 28, and a second body member, housing member, structural member, etc., shown as second body member 30. First body member 28 and second body member 30 can define opposite sides of reel 12. Spool 20 can be positioned between first body member 28 and second body member 30 and may extend between first body member 28 and second body member 30. Spool 20 can be supported or rotatably coupled on either end with first body member 28 and second body member 30. Spool 20 may rotate relative to first body member 28 and second body member 30.

Reel 12 includes a guide member 900 that is configured to extend between first body member 28 and second body member 30 and be driven to rotate by rotation of handle 36. In some embodiments, guide member 900 is configured to engage fishing line 26 at a contact point 901. Fishing line 26 may be guided onto spool 20 from contact point 901. For example, fishing line 26 may extend from contact point 901 onto spool 20 where it is then wound onto spool 20. Rotation of guide member 900 can result in reciprocative translation of contact point 901. For example, as guide member 900 rotates, contact point 901 may shift back and forth along guide member 900 between opposite ends of guide member 900. In this way, fishing line 26 is guided and wound onto spool 20 along an entire longitudinal length of spool 20, thereby facilitating an even distribution of fishing line 26 on spool 20 and reducing knotting and/or bunching of fishing line 26 on spool 20 (e.g., an uneven distribution of fishing line 26). Evenly distributing and winding fishing line 26 on spool 20 can reduce a likelihood of fishing line 26 snagging, knotting, or becoming tangled when fishing line 26 is let out (e.g., released) from spool 20 (e.g., for casting operations).

Referring still to FIGS. 1 and 2, input shaft 32 extends through first body member 28 and protrudes outwards from first body member 28. Handle 36 is coupled with input shaft 32 exterior of first body member 28 so that handle 36 can be operated by a fisherman's right hand while rod 14 is held by the fisherman's left hand. In other embodiments, input shaft 32 extends outwards through second body member 30 so that handle 36 is operated by the fisherman's left hand while rod 14 is held by the fisherman's right hand.

Referring particularly to FIG. 1, reel 12 includes an input member, a bar, a rotatable linkage, a translatable member, a lever, a button, etc., shown as lever 38. Lever 38 may extend between first body member 28 and second body member 30 and may be pivotable, rotatable, and/or translatable between a first position and a second position. In some embodiments, lever 38 is configured to be transitioned between the first position and the second position to selectively couple input shaft 32 with spool 20.

Referring still to FIG. 1, reel 12 can include a first structural member, a first frame member, etc., shown as first frame member 40, and a second structural member, a second frame member, etc., shown as second frame member 42. First frame member 40 and second frame member 42 can be parallel with each other and may both extend in a longitudinal direction that is defined by central axis 34. First frame member 40 and second frame member 42 may be positioned within first body member 28 and second body member 30, respectively or may be positioned within an inner volume that is at least partially defined by first body member 28 and second body member 30.

Referring still to FIG. 1, reel 12 can include a central body member, a central housing, etc., shown as body member 44. In some embodiments, body member 44 extends between first body member 28 and second body member 30. First body member 28 and body member 44 may cooperatively define a first inner volume in which first structural member 40 is positioned. Second body member 30 and body member 44 may cooperatively define a second inner volume in which second structural member 42 is positioned.

Reel Clicker

As shown in FIGS. 3-8, a noisemaker, reel clicker, clicker assembly, shown as clicker system 100, includes a sprocket, sprocket wheel, or chainwheel, shown as sprocket 110. The sprocket 110 is coupled to the input shaft 32, where rotation of the input shaft 32 rotates the sprocket 110 in the same direction. For example, rotation of the input shaft 32 in the first direction (e.g., shown as direction 24 in FIG. 2) generates a similar rotation of the sprocket 110. The sprocket 110 includes a plurality of sprocket teeth, shown as teeth 115. The sprocket teeth 115 are uniformly positioned along the circumference of the sprocket 110. Clicker system 100 also includes a pawl, shown as clicker 120. Clicker 120 is coupled to the first body member 28, proximate the top of the reel 12. The clicker 120 may be configured to engage at least one of the plurality of teeth 115 when the sprocket 110 is rotated. To be more precise, the clicker 120 may be configured to slide in an out of engagement with the plurality of teeth 115 when the sprocket 110 rotates in at least the first direction. The clicker system 100 may be configured to emit a click when the sprocket 110 rotates in at least the first direction, where the click is from the clicker 120 interfacing with the sprocket 110. In some embodiments, the clicker system 100 is silent when the sprocket 110 rotates in at least one of the first direction and the second direction.

Referring still to FIGS. 3-8, the clicker system 100 further includes a set of arms, shown as clicker arms 130. Clicker arms 130 may include first clicker arm 140 and second clicker arm 150. The first clicker arm 140 and the second clicker arm 150 may be dimensionally similar. In some embodiments, the first clicker arm 140 may have different dimensions than the second clicker arm 150. The clicker arms 130 may be positioned so to surround at least a portion of the sprocket 110, where the clicker arms 130 abut the clicker 120. The clicker arms 130 are coupled to the first body member 28 by a set of pivot joints, shown as pivot joints 160. As shown, the first clicker arm 130 may be coupled to a first pivot joint 170 and the second clicker arm 140 may be coupled to a second pivot joint 180. The pivot joints 160 may be further configured to allow the clicker arms 130 to pivot about the respective first pivot joint 170 and second pivot joint 180. In some embodiments, the clicker system 100 may only include a single clicker arm that is coupled to a single pivot joint. The first clicker arm 140 may include a first upper portion 142 and a first lower portion 144. The first upper portion 142 and the first lower portion 144 are fixedly coupled to one another at the first pivot joint 170. The second clicker arm 150 may include a second upper portion 152 and a second lower portion 154. The second upper portion 152 and the second lower portion 154 are fixedly coupled to one another at the second pivot joint 180.

Figure 4:
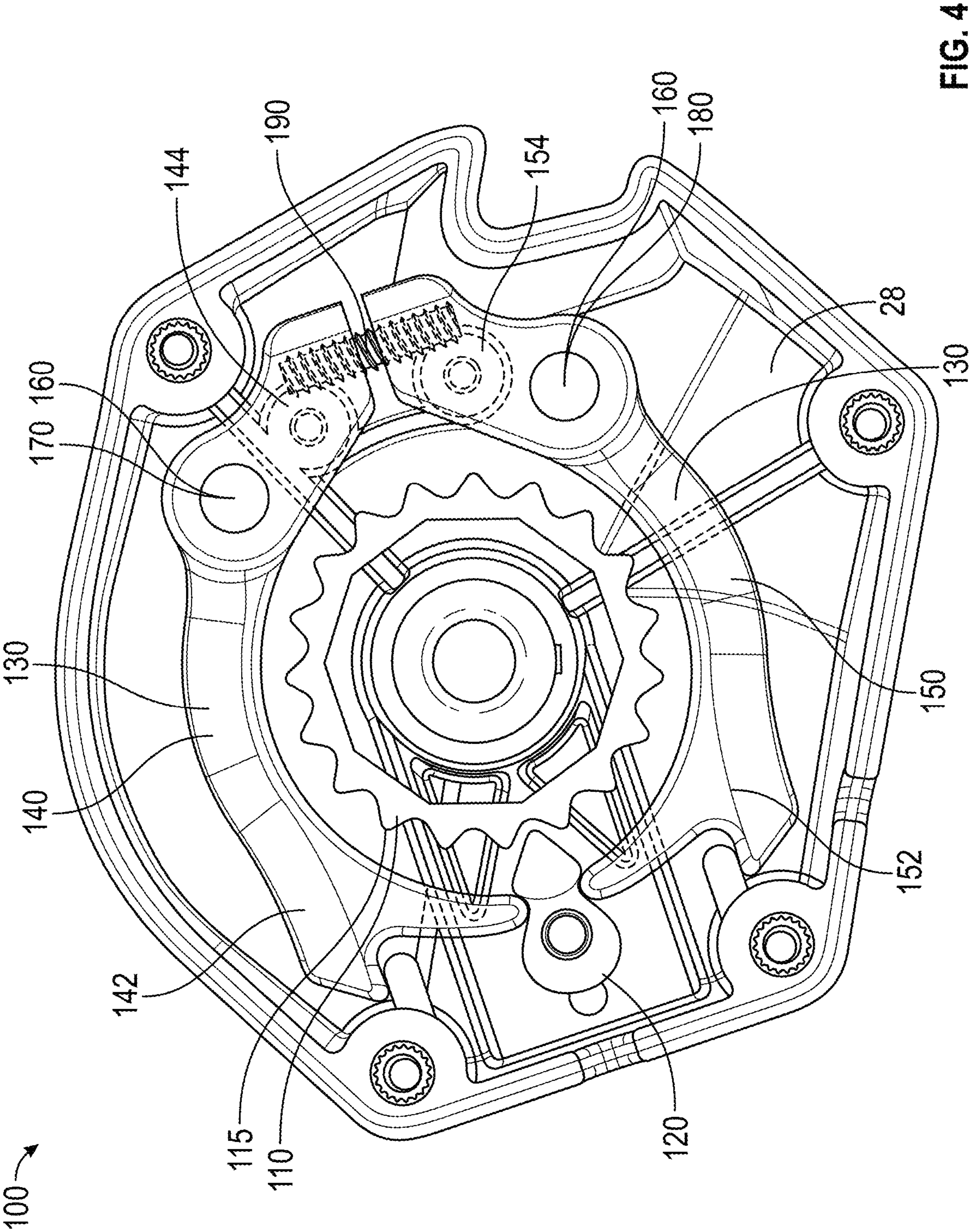
FIG. 4 is a front view of the noisemaker of FIG. 3 including the spring, according to an exemplary embodiment.

The first upper portion 142 and the second upper portion 152 may define a first length, where the first length may be the distance between from the tip of the upper portion 142, proximate the clicker 120, to the pivot joints 160. The first lower portion 144 and the second lower portion 154 may define a second length, where the second length may be the distance from the pivot joints 160 to the end of the clicker arms 130, proximate a spring (e.g., spring 190 as shown in FIG. 4). The first upper portion 142 and the second upper portion 152 may be larger in length than the first lower portion 144 and the second lower portion 154. In some embodiments, the first upper portion 142 and the second upper portion 152 may be smaller in length than the first lower portion 144 and the second lower portion 154. The first length and the second length define a length ratio, where the length ratio is the length of the first length to the second length. By changing the length ratio, more or less force may be applied onto the clicker 120.

Referring now to FIG. 4, positioned between the first clicker arm 140 and the second clicker arm 150, opposite the clicker 120, is an elastic member, spring, or return mechanism, shown as spring 190. The spring 190 may be coupled to both the first clicker arm 140 and the second clicker arm 150. In some embodiments, the spring 190 may be coupled to one of the first clicker arm 140 and the second clicker arm 150. The spring 190 may be configured to bias the clicker arms 130 into a closed position, where the clicker arms 130 abut the clicker 120. In some embodiments, the clicker system 100 may utilize a different spring with a different spring force. In such an embodiment, the different spring may provide a different sound or feel to the clicker system 100. For example, a higher spring force applies a stronger force onto the clicker arms 130 allowing for minimal movement of the clicker 120 and an overall softer click sound. A lower spring force applies a lower force onto the clicker arms 130 allowing for increased movement of the clicker 120 and an overall louder click sound.

Figure 5:
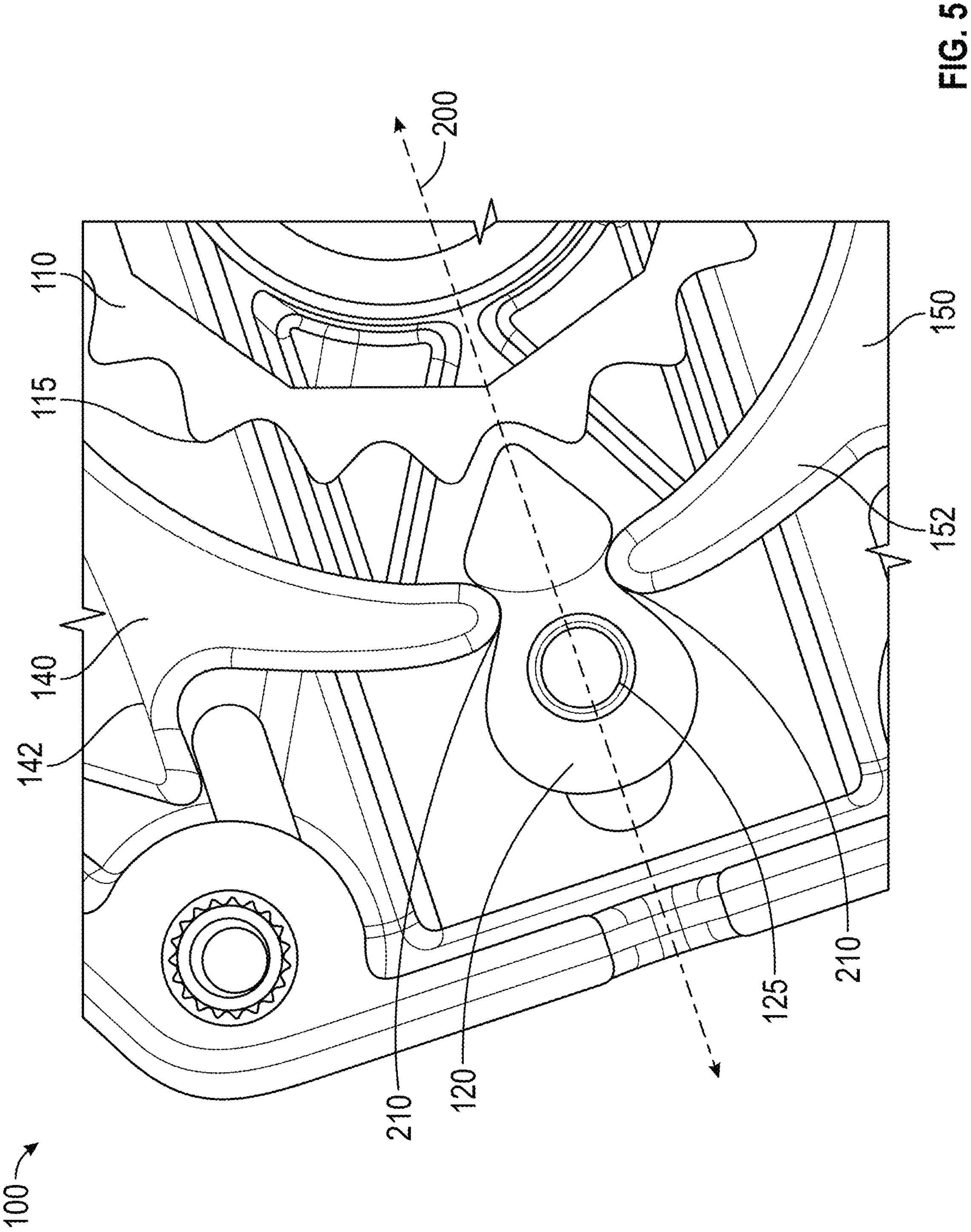
FIG. 5 is a detailed front view of the noisemaker of FIG. 3, with the pawl in an engaged position, according to an exemplary embodiment.
Figure 6:
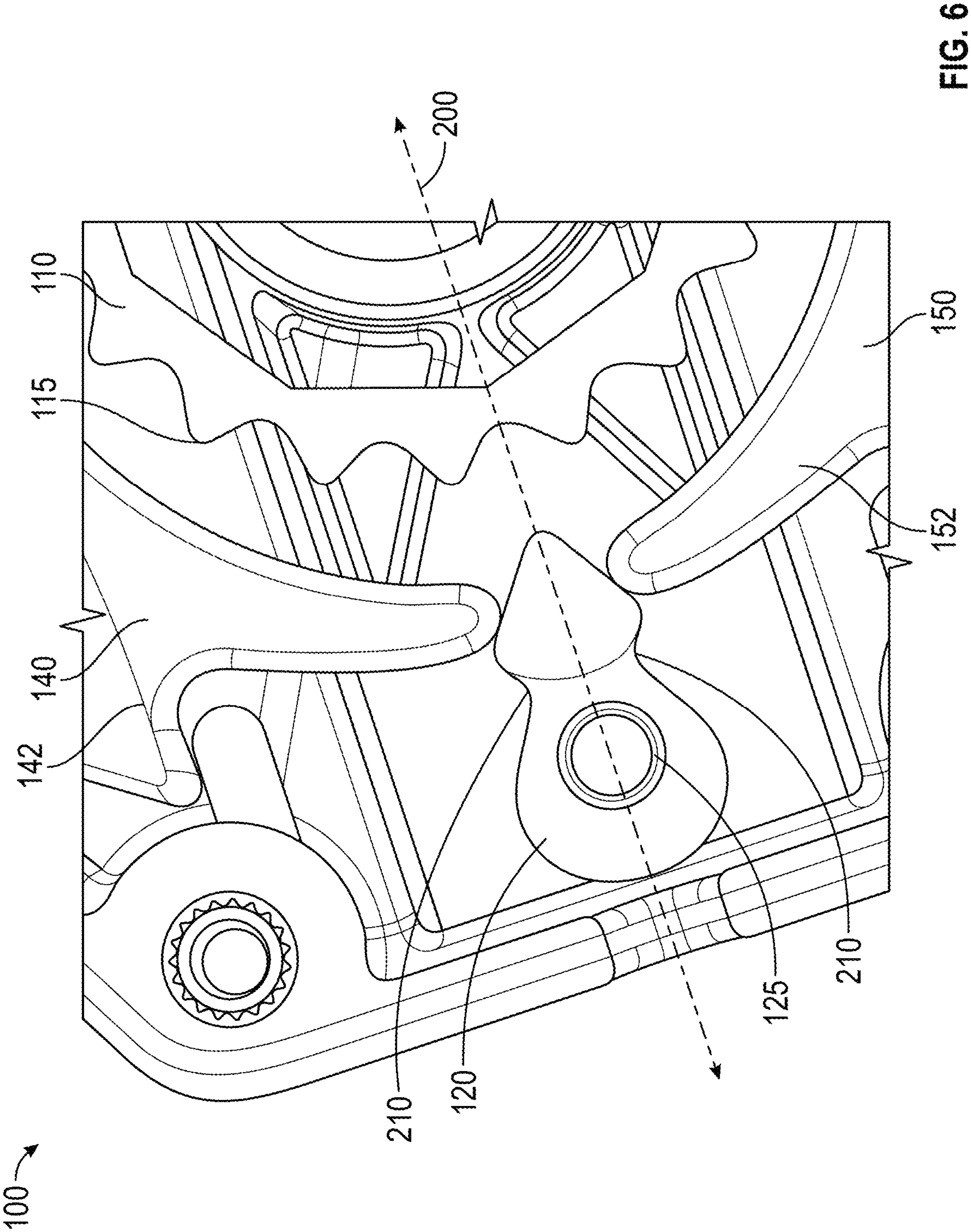
FIG. 6 is a detailed front view of the noisemaker of FIG. 3, with the pawl in a disengaged position, according to an exemplary embodiment.

Referring generally to FIGS. 5 and 6, the clicker 120 is selectively repositionable between a first position and a second position. The clicker 120 is selectively repositionable along an axis, shown as X-X axis 200. The first position is defined as an engaged position where the clicker 120 may interface with the sprocket 110. The second position is defined as a disengaged position, where the clicker 120 may not interface with the sprocket 110. The clicker 120 is selectively repositionable between the engaged position and the disengaged position by the user interfacing with a button along the X-X axis 200, although the button is not shown in the FIGURES.

Referring specifically to FIG. 5, the clicker system 100 is shown, in an engaged position. In the engaged position, the clicker 120 is slidably repositioned into a position proximate the sprocket 110. The clicker 120 includes pockets, concave portions, grooves, or radius portions, shown as clicker pockets 210. The clicker pockets 210 are positioned opposite one another along the clicker 120. According to an exemplary embodiment, the first upper portion 142 and the second upper portion 152 may be configured to abut against the clicker 120 at the clicker pockets 210, where the clicker pockets 210 define a similar geometry to at least one of the first upper portion 142 and the second upper portion 152. In some embodiments, the clicker 120 only includes a single clicker pocket 210, where the clicker pocket 210 is selectively coupled to at least one of the first upper portion 142 and the second upper portion 152. As shown in FIG. 5, the clicker 120 is positioned proximate the sprocket 110, where rotation of the sprocket 110 causes the plurality of teeth 115 to interact with the clicker 120.

Referring specifically to FIG. 6, the clicker system 100 is shown, in a disengaged position. In the disengaged position, the clicker 120 is slidably repositioned into a position distal the sprocket 110. To be more precise, the clicker 120 is slidably repositioned distal the sprocket 110 where the first upper portion 142 and the second upper portion 152 abut the clicker 120 distal the clicker pockets 210. In the disengaged position, the clicker 120 may be positioned a distance away from the sprocket 110, so that rotation of the sprocket 110 does not contact the clicker 120. The distance away from the sprocket 110 may be any distance where the clicker 120 may not contact the sprocket 110.

Figure 7:
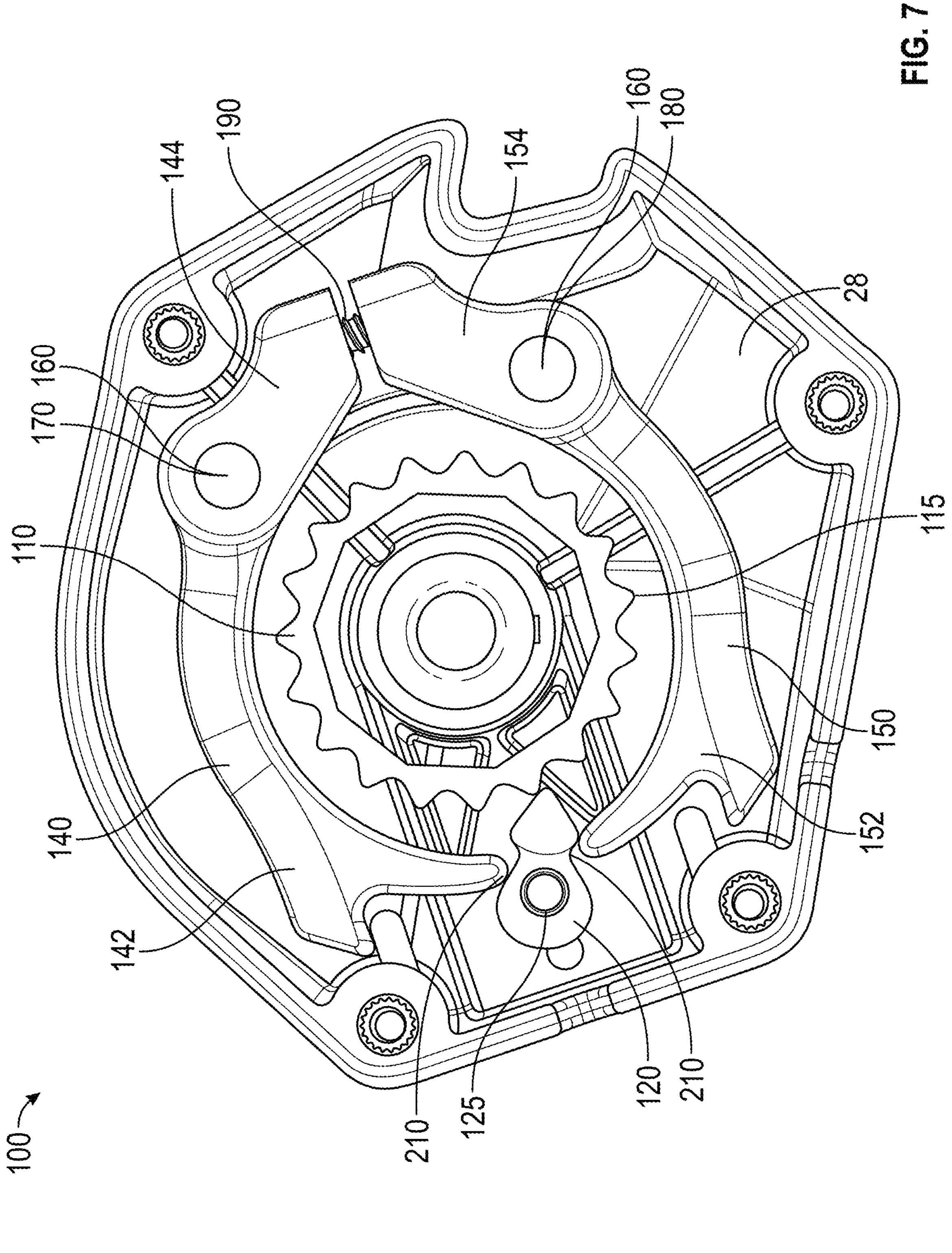
FIG. 7 is a front view of the noisemaker of FIG. 3, in a rotated position, according to an exemplary embodiment.

Referring now to FIG. 7, the clicker system 100 is shown with the sprocket 110 in a rotated position. The clicker 120 includes a pivot or joint, shown as clicker pivot 125. The clicker pivot 125 is slidably coupled to the clicker 120 where the clicker 120 can rotate about the clicker pivot 125. As shown in FIG. 7, the clicker 120 is in a rotated position, where the clicker 120 is pivoted angular to the X-X axis 200. The angle of the clicker 120 against the X-X axis 200 may be determined based on an angular rotation of the sprocket 110. For example, the clicker 120 will have an increasing angle until the clicker 120 crests at least one of the plurality of teeth 115. Once the clicker 120 crests the plurality of teeth 115, the clicker 120 returns into a neutral position (e.g., shown in FIG. 8) by the spring 190 providing a biasing force onto the clicker arms 130, with at least one of the first upper portion 142 and the second upper portion 152 rested into the clicker pockets 210. When the clicker 120 returns back to the neutral position, the clicker 120 creates an audible click. The audible click is a sound identifier to let the user know if fishing line is (a) being returned back onto the spool 20 or (b) being pulled off the spool 20 by an external force. The audible click may further be the reaction from the clicker 120 colliding with one of the plurality of teeth 115 upon returning to the neutral position.

Figure 8:
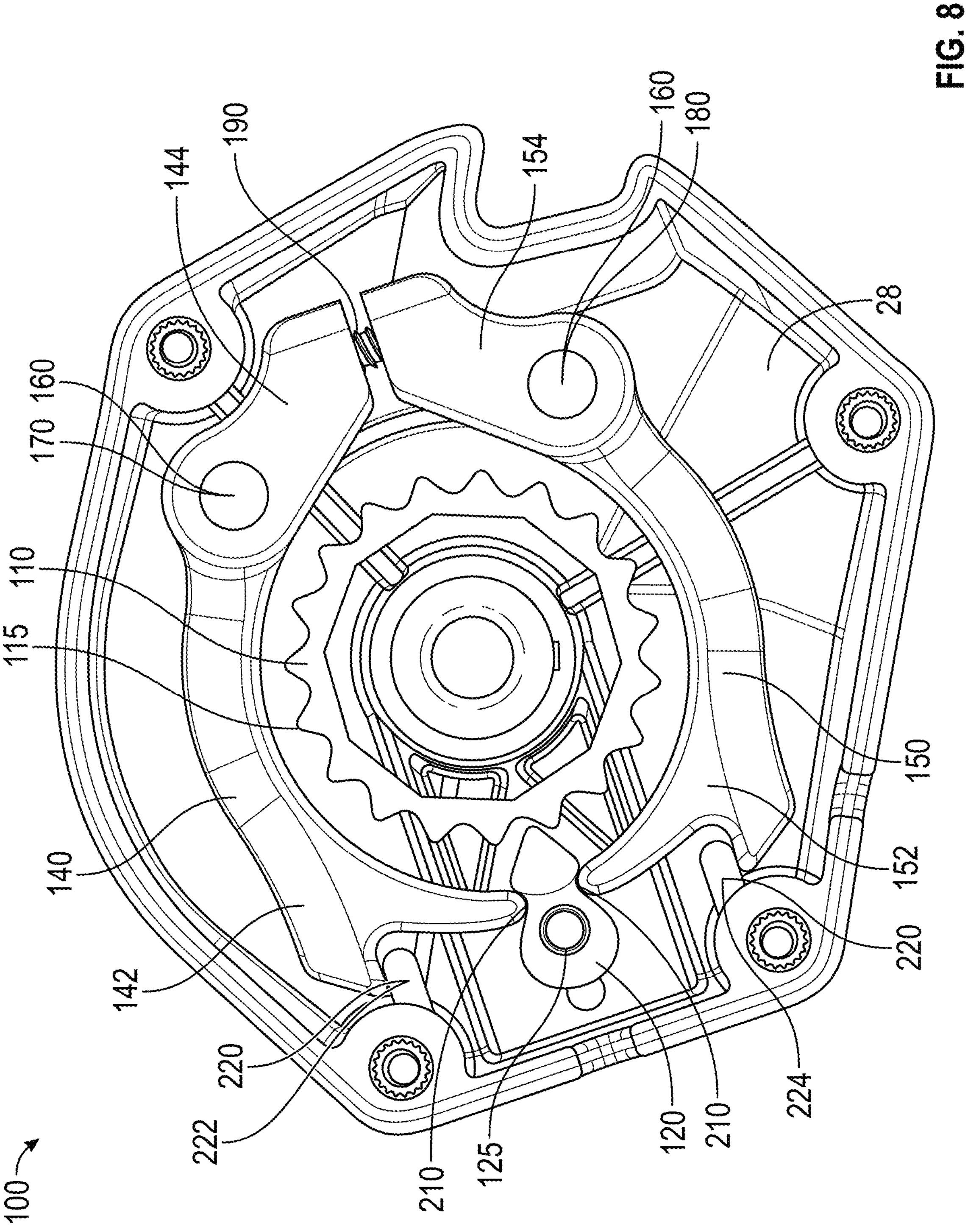
FIG. 8 is a front view of the noisemaker of FIG. 3, according to an exemplary embodiment.

Referring now to FIG. 8, the clicker system 100 includes bumpers, stops, fixed portions, shown as clicker stops 220. The clicker stops 220 may be configured to be features fixedly coupled to the first body member 28. In some embodiments, the clicker stop 220 may be selectively coupled to the first body member 28, where the user may attach or detach the clicker stops 220 for a varying clicker system. As shown, the clicker system 100 includes two clicker stops 220, each respectively positioned proximate to one of the first clicker arm 140 and the second clicker arm 150. By way of example, the clicker system 100 includes a first clicker stop 222, configured to abut the first clicker arm 140, and a second clicker stop 224, configured to abut the second clicker arm 150. In some embodiments, the clicker system 100 may include any number of clicker arms 130, where the number of clicker arms 130 determines the number of clicker stops 220.

The clicker stops 220 may be configured to abut one of the first upper portion 142 and the second upper portion 152 to prevent movement in the direction towards the clicker 120. According to an exemplary, when the clicker 120 is in the engaged position, rotational movement of the sprocket 110 creates a pivotable movement of the clicker 120 about the clicker pivot 125. In such an embodiment, the clicker 120 may engage one of the first clicker arm 140 and the second clicker arm 150, pushing one of the first upper portion 142 and the second upper portion 152 away from one of the first clicker stop 222 and the second clicker stop 224. The clicker arm 130 not being engaged (e.g., one of the first clicker arm 140 and the second clicker arm 140) may be configured to abut one of the first clicker stop 222 and the second clicker stop 224 to prevent unnecessary movement of the clicker arms 130. As can be appreciated, prevention of unnecessary movement of the clicker arms 130 may reduce system wear imposed onto the clicker system 100.

Referring generally to FIGS. 3-8, when the clicker 120 is in the engaged position, the sprocket 110 may rotate in one of a first direction (e.g., direction 24 in FIG. 2) and a second direction (e.g., opposite the direction 24 in FIG. 2). Rotation of the sprocket 110 in the first direction may cause the clicker 120 to move toward the second clicker arm 150, where the first clicker arm 140 may abut the first clicker stop 222. Rotation of the sprocket 110 in the second direction may cause the clicker 120 to move toward the first clicker arm 140, where the second clicker arm 150 may abut the second clicker stop 224.

According to an exemplary embodiment, the clicker arms 130 may be manufactured using various materials (e.g., plastic, metal, composite, etc.) because the clicker system 100 does not impose the same wear effects as traditional systems. Furthermore, the clicker arms 130 may not need to flex, and, as such, materials with lower elasticity may be used. The combination of the clicker arms 130, spring 190, and clicker stops 220 may cause the clicker system 100 to have decreased wear promoting the life span of the clicker system 100.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A baitcaster for retrieving a fishing line, the baitcaster comprising:

a noisemaker configured to alert a user in response to rotation of a spool, the noisemaker comprising:

a sprocket;

a pawl; and a set of arms abutting the pawl and positioned on opposite sides of the pawl, the set of arms being rigid, the set of arms comprising hooked ends configured to engage the pawl, and protrusions extending from the set of arms in a direction different than the hooked ends;

wherein the pawl is positioned to engage the sprocket when the sprocket rotates to create an audible alert; and wherein the protrusions abut stops, the stops configured to prevent movement of the set of arms towards the pawl past a neutral position.

2. The baitcaster of claim 1, wherein the set of arms includes a first arm and a second arm, the first arm configured to abut the pawl on a first side of the pawl and the second arm configured to abut the pawl on a second side of the pawl.

3. The baitcaster of claim 1, wherein the noisemaker further comprises a first joint and a second joint positioned opposite one another, the first joint being pivotably coupled to a first arm and the second joint being pivotably coupled to a second arm.

4. The baitcaster of claim 1, wherein the noisemaker further comprises a spring at least partially disposed within the set of arms, the spring configured to bias the set of arms to abut the pawl.

5. The baitcaster of claim 1, wherein a first of the set of arms comprises a first upper portion and a first lower portion, the first upper portion defining a length greater than a length of the first lower portion, and wherein a second of the set of arms comprises a second upper portion and a second lower portion, the second upper portion defining a length greater than a length of the second lower portion.

6. The baitcaster of claim 5, further comprising a spring that provides a force onto the set of arms that is based on a ratio from a length of the first upper portion to the first lower portion.

7. The baitcaster of claim 1, wherein the pawl is selectively repositionable between a first position in which the pawl is engageable with the sprocket and a second position where the pawl is limited from contacting the sprocket.

8. The baitcaster of claim 7, further comprising a pawl axis extending along a midpoint of the pawl and a midpoint of the sprocket, and wherein the pawl is positioned along the pawl axis at a first location when the pawl is in the first position and at a second location along the pawl axis when the pawl is in the second position.

9. The baitcaster of claim 1, wherein the baitcaster further comprises a housing, the spool positioned at least partially within the housing and comprising a spindle.

10. The baitcaster of claim 1, wherein the pawl further comprises a set of recesses positioned on each side of the pawl, the set of recesses configured to receive an end of each of the set of arms to prohibit the pawl from repositioning away from the sprocket.

11. A clicker system for a fishing reel, the clicker system comprising:

a sprocket;

a pawl; and a set of arms configured to abut the pawl, the set of arms comprising:

a first arm pivotally coupled to a first joint on a first side of the pawl; and a second arm pivotally coupled to a second joint on a second side of the pawl, opposite the first side;

wherein the first arm and the second arm comprise hooked ends configured to engage the pawl and protrusions extending from the first arm and the second arm; and wherein the protrusions abut stops fixedly coupled to a housing of the fishing reel, the stops configured to limit movement of the first arm and the second arm towards the pawl past neutral positions.

12. The clicker system of claim 11, wherein the first arm is configured to abut the pawl on a first side of the pawl and the second arm is configured to abut the pawl on a second side of the pawl.

13. The clicker system of claim 11, wherein the first arm comprises a first upper portion and a first lower portion, the first lower portion coupled to the first joint; and wherein the first upper portion defining a length greater than a length of the first lower portion.

14. The clicker system of claim 13, wherein the second arm comprises a second upper portion and a second lower portion, the second lower portion coupled to the second joint; and wherein the second upper portion defines a length greater than a length of the second lower portion.

15. The clicker system of claim 14, wherein a force provided from a spring to one of the first arm and the second arm is determined based on a ratio from a length of the first upper portion to the first lower portion.

16. The clicker system of claim 11, further comprising an axis extending through the pawl, the pawl selectively repositionable between a first position and a second position along the axis.

17. The clicker system of claim 11, further comprising:

a spring coupled to one of the first arm and the second arm opposite the pawl, the spring configured to provide a force onto at least one of the first arm and the second arm;

wherein the pawl is selectively coupled to the sprocket, the pawl repositionable between a first position and a second position;

wherein the pawl contacts the sprocket when in the first position and does not contact the sprocket when in the second position, wherein the sprocket rotates a first direction and a second direction, and wherein the pawl creates an audible click in the first position when the sprocket rotates in one of the first direction and the second direction; and wherein the protrusions extend in directions different than the hooked ends.

18. The clicker system of claim 11, wherein one of the first arm and the second arm abut the stops when the sprocket rotates in one of a first direction or a second direction.

19. A fishing rod assembly, comprising:

a rod; and a fishing line retrieval apparatus fixedly coupled with the rod, the fishing line retrieval apparatus configured to retrieve a fishing line that extends along the rod, the fishing line retrieval apparatus comprising:

a clicker system configured to alert a user, the clicker system comprising:

a sprocket rotatable in a first direction and a second direction;

a pawl selectively coupled to the sprocket, the pawl translatable along a slot between a first position and a second position; and an arm configured to abut the pawl, the arm comprising an end configured to engage the pawl and a protrusion extending from the arm;

wherein the pawl contacts the sprocket when in the first position and does not contact the sprocket when in the second position, and wherein the pawl creates an audible click in the first position; and wherein the protrusion abuts a stop, the stop configured to prevent movement of the arm towards the pawl past a neutral position.

20. The fishing rod assembly of claim 19, further comprising:

a spring coupled to the arm, the spring configured to provide a force onto the arm to engage the arm against the pawl;

wherein the force provided from the spring to the arm is determined based on a ratio from a length of an upper portion of the arm to a lower portion of the arm; and wherein the protrusion extends in a direction different than the end.

* * * * *